United States Patent [19]

Spirk

[11] 4,283,648

[45] Aug. 11, 1981

[54] SYNCHRONOUS ELECTRIC MACHINE WITH SALIENT POLES IN THE ROTOR

[75] Inventor: Franz Spirk, Berlin, Fed. Rep. of Germany

[73] Assignee: Siemens Aktiengesellschaft, Berlin & Munich, Fed. Rep. of Germany

[21] Appl. No.: 53,501

[22] Filed: Jun. 28, 1979

[30] Foreign Application Priority Data

Jul. 4, 1978 [DE] Fed. Rep. of Germany ....... 2829745

[51] Int. Cl.³ .............................................. H02K 1/24
[52] U.S. Cl. .................................... 310/269; 310/218
[58] Field of Search ................ 310/162, 163, 216–218, 310/261, 262, 265, 269

[56] References Cited

U.S. PATENT DOCUMENTS

| 969,790 | 9/1910 | Mattman | 310/269 |
|---|---|---|---|
| 1,687,513 | 10/1928 | Reist | 310/269 |
| 1,817,054 | 8/1931 | Baudry | 310/269 X |
| 3,271,607 | 9/1966 | Slotnick et al. | 310/269 |
| 3,555,329 | 1/1971 | Meyer | 310/218 |

FOREIGN PATENT DOCUMENTS 129020 12/1899 Fed. Rep. of Germany.

Primary Examiner—Mark O. Budd
Attorney, Agent, or Firm—Kenyon & Kenyon

[57] ABSTRACT

In a synchronous electric machine with salient poles in its rotor, which are supported by a lamination chain, one sided large enlargements of the lamination chain deviating from a circular shape are prevented by straps arranged between the hub body and the lamination chain, the attachment of the straps at the lamination chain, with the machine standing still, being with a play which corresponds approximately to the mean expansion of the lamination chain at the runaway speed. If this play is taken up through expansion of the lamination chain due to one-sided forces, then the straps prevent further expansion. The invention is of advantage especially for slowly rotating hydroelectric generators.

5 Claims, 3 Drawing Figures

SYNCHRONOUS ELECTRIC MACHINE WITH SALIENT POLES IN THE ROTOR

BACKGROUND OF THE INVENTION

This invention relates to electric machines in general and more particularly to a synchronous electric machine with salient poles in its rotor.

Synchronous electric machines with salient poles in their rotors which are supported by a ring body built up from segments, called a lamination chain, which in turn is fastened via a disc shaped or star shaped hub member to the rotor shaft, are described, for instance, in U.S. Pat. Nos. 3,128,403 and 3,529,193. The lamination chain absorbs the centrifugal forces occurring at the salient poles and is thereby radially enlarged. This enlargement can reach radial amounts of 10 to 15 mm especially in slow running hydro-electric generators with a rotor diameter of up to 20 m or more.

If such enlargement are to be taken up by the customary shrink connection between the hub member and the lamination chain without lifting of the lamination chain, the very large shrinkage forces occurring when the machine is standing still bring with them the danger of buckling of the hub arms or hub discs, or the design of the hub, if it is laid out in view of these large shrinkage forces, becomes entirely uneconomical. It is therefore customary to choose the shrink fit so that the lamination chain is lifted from the hub only at approximately 110 to 120% of the nominal speed of rotation. Above this speed, the ring body of the lamination chain expands freely and is constrained only by tangential wedges.

Because of the low flexural stiffness of lamination chains with a large diameter, a deviation of the lamination chain from the circular shape can come about due to unavoidable asymmetrical weight distributions at the circumference, due to nonuniform wedging or due the uneven magnetic pull. In an extreme case this can lead to bridging the air gap, which is relatively small in synchronous machines with such a large diameter. It is therefore an object of the invention to make sure that, if such large enlargements occur when the maximum overspeed is reached, the circular shape of the lamination chain as well as its concentric position are preserved.

SUMMARY OF THE INVENTION

To solve this problem, there are arranged in a synchronous electric machine of the type described at the outset, between the hub member and the lamination chain, straps which are fastened on the one side to the hub body and on the other side to the lamination chain, the fastening at the lamination chain having an amount of play at standstill, which corresponds approximately to the mean enlargement of the lamination chain at the maximum overspeed, i.e., at the runaway speed.

These straps fastened to the lamination chain with play are not stressed during normal operation of the machine. Thus, the enlargement of the lamination chain also is not influenced in normal speed range. If, however, the lamination chain is enlarged at overspeed to such an extent that the play is taken up, then the straps, which are arranged particularly in places where the enlargements would deviate from the normal circular shape, prevent locally deviating deformations. With proper design of the straps it is therefore possible to compensate one-sided forces in such a manner that an approximately uniform enlargement of the lamination chain is ensured.

The straps can be arranged at the end faces of the lamination chain as well as in the cooling slots which are already provided for ventilating the lamination chain. If the forces to be taken up by the straps become too large, it is advisable to arrange the straps in pairs.

DETAILED DESCRIPTION OF THE INVENTION

Figure 1:
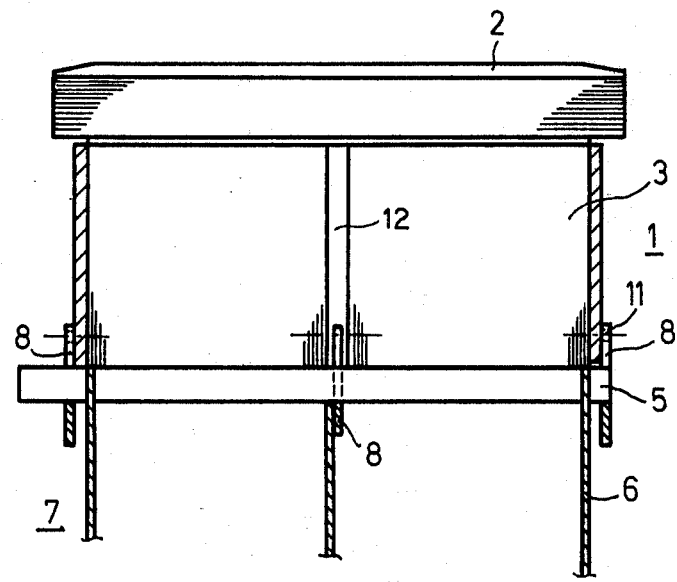
FIG. 1 diagrammatically illustrates parts of a longitudinal section of the rotor of a synchronous electric machine with a star shaped hub body.
Figure 2:
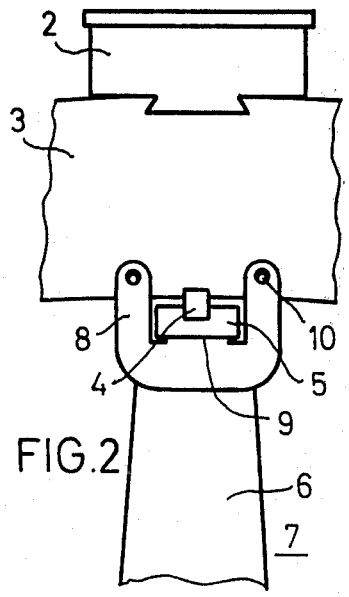
FIG. 2 is a portion of the view onto an end face of the machine.

In a slowly rotating hydroelectric generator with a rotor 1 of very large diameter, the salient poles 2 are supported by a lamination chain 3. The latter is, in turn, shrunk on keys 4 which are located in the head beam 5 at the end of the arms 6 of a star shaped hub body 7. The shrink fit is designed so that the lamination chain 3 is lifted off the head beams 5, due to its enlargement, at approximately 10 to 20% above the nominal speed of rotation and is then guided only by the side walls of the keys 4.

At the end faces of the rotor, straps 8 are arranged between the arms 6 of the hub body and the lamination chain 3. These straps 8 are formed as brackets, the middle 9 of which surrounds the head beam 5, which extends beyond the walls of the arms at the end faces, and rests against the latter. The straps 8 are fastened to the lamination chain 3 with bolts which are not shown in FIG. 1. The holes 11 in the straps 8 for receiving the bolts 10 are made eccentric in such a way that in the direction toward the larger radius, play is provided which, with the machine standing still, corresponds approximately to the mean enlargement of the lamination chain 3 at the runaway speed. In normal operation of the machine, these straps 8 are not stressed by the occurring centrifugal forces and also do no inhibit the expansion of the lamination chain 3 as long as the lamination chain 3 expands purely concentrically.

If, on the other hand, deviations of the lamination chain 3 from the circular shape occur due to large one-sided forces such as unbalance or a one-sided magnetic pull, then those points of the lamination chain at which the deviations exceed the calculated mean expansion at the runaway speed are restrained, by the straps 8, from further one-sided deformation because the play in the fastening is taken up. Thereby, these one-sided forces are compensated in such a manner that an approximately uniform enlargement of the lamination chain 3 is ensured.

Since radial cooling slots 12 are usually provided inside the lamination chain 3, it is possible to also arrange straps 8 inside these cooling slots 12.

Figure 3:
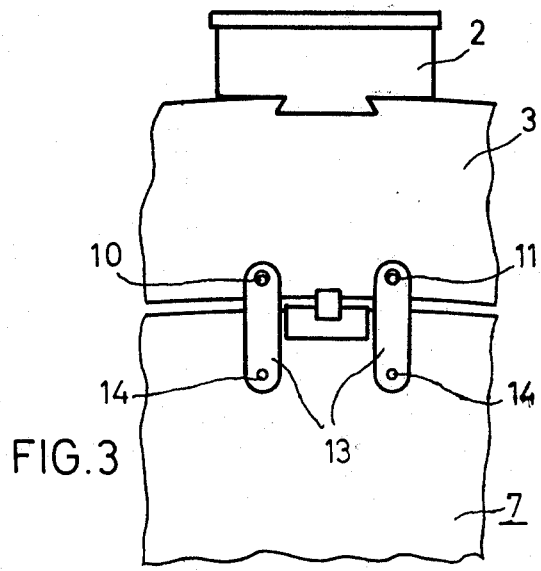
FIG. 3 is likewise a partial view onto an end face of the rotor of a synchronous machine, the hub body of which is of disc shaped design.

In the embodiment shown in FIG. 3, in which the same reference symbols were retained for like parts, the lamination chain 3 is supported by a disc shaped hub body 7. Therefore, simple straps 13 arranged in pairs are provided adjacent to the head beam 5, and are fastened to the disc shaped hub body 7 with bolts 14. These straps 13 also have holes 11 which serve for fastening to the lamination chain 3 with bolts 10 and are of asymmetrical design, providing the desired play.

What is claimed is:

1. In a synchronous electric machine in the form of a slowly rotating hydroelectric generator having salient poles in its rotor, said poles supported by a ring body which is constructed as a lamination chain from segments and is in turn fastened to the rotor shaft by means of a disc or star shaped hub body, said lamination chain guided by a tangential wedging, with additional parts fastened respectively to the hub body and the lamination chain, one of the fastenings having play, the improvement comprising, the lamination chain fastened to said hub body in such a manner that it will lift off said hub body at a speed above rated speed, and the additional parts being in the form of straps fastened respectively to the hub body and lamination chain at points distributed uniformly around the circumference, with the play at the fastening of said straps corresponding approximately to the mean enlargement of the lamination chain at maximum overspeed, when the lamination chain is lifted off the hub body.

2. The improvement according to claim 1, wherein said straps are disposed at the end faces of the machine.

3. The improvement according to claim 1 or 2, wherein straps are located in cooling slots of the lamination chain.

4. The improvement according to claim 1, wherein said straps are arranged in pairs.

5. The improvement according to claim 4 wherein the synchronous electric machine has a star shaped hub body, with arms having, at their end facing the lamination chain, a head beam, and wherein each pair of straps is designed as a bracket which surrounds the head beam.

* * * * *